United States Patent
Tonooka et al.

(10) Patent No.: US 9,672,856 B1
(45) Date of Patent: Jun. 6, 2017

(54) PERPENDICULAR MAGNETIC RECORDING MEDIA WITH LATERAL EXCHANGE CONTROL LAYER

(71) Applicant: HGST Netherlands B.V., Amsterdam (NL)

(72) Inventors: Shun Tonooka, Odawara (JP); Masayoshi Shimizu, Chigasaki (JP); Miki Nishida, Fujisawa (JP); Hiroyuki Katada, Odawara (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/946,648

(22) Filed: Nov. 19, 2015

(51) Int. Cl.
G11B 5/66 (2006.01)
G11B 5/73 (2006.01)
G11B 5/65 (2006.01)

(52) U.S. Cl.
CPC ............. *G11B 5/66* (2013.01); *G11B 5/653* (2013.01); *G11B 5/656* (2013.01); *G11B 5/731* (2013.01)

(58) Field of Classification Search
None
See application file for complete search history.

(56) References Cited

U.S. PATENT DOCUMENTS

| | | | |
|---|---|---|---|
| 7,846,563 B2 | 12/2010 | Berger et al. | |
| 7,923,134 B2* | 4/2011 | Ichihara | B82Y 10/00 216/22 |
| 8,202,636 B2 | 6/2012 | Choe et al. | |
| 8,614,862 B1 | 12/2013 | Shimizu et al. | |
| 8,728,637 B2 | 5/2014 | Wu et al. | |
| 2006/0246323 A1* | 11/2006 | Liu | G11B 5/65 428/829 |
| 2006/0269797 A1 | 11/2006 | Lu et al. | |
| 2007/0243418 A1* | 10/2007 | Fullerton | G11B 5/65 428/828 |
| 2008/0070065 A1* | 3/2008 | Berger | G11B 5/65 428/828.1 |
| 2008/0261078 A1* | 10/2008 | Berger | G11B 5/02 428/800 |

(Continued)

OTHER PUBLICATIONS

Choe et al., "Control of Exchange Coupling Between Granular Oxide and Highly Exchange Coupled Cap Layers and the Effect on Perpendicular Magnetic Switching and Recording Characteristics," IEEE Transactions on Magnetics, vol. 45, No. 6, Jun. 2009, pp. 2694-2700.

(Continued)

*Primary Examiner* — Kevin Bernatz
(74) *Attorney, Agent, or Firm* — Zilka-Kotab, P.C.

(57) ABSTRACT

A magnetic media having a lateral exchange control layer formed on a magnetic oxide layer of a magnetic recording layer. A cap layer is formed over the lateral exchange control layer. The lateral exchange control layer can be an alloy comprising Co and one or more of W, Ru, Hf, Ta, Nb and Fe. The lateral exchange control layer has the highest magnetic saturation moment among all the recording layers, and increases spacing between magnetic grains (e.g. increased non-magnetic boundary width), thereby reducing lateral exchange sigma. The presence of lateral exchange control increases signal to noise ratio and reduces bit error rate and increases areal density.

17 Claims, 13 Drawing Sheets

(56) References Cited

U.S. PATENT DOCUMENTS

| | | | | |
|---|---|---|---|---|
| 2008/0292907 A1* | 11/2008 | Berger | ............... | G11B 5/65 |
| | | | | 428/828 |
| 2009/0155627 A1* | 6/2009 | Berger | ............... | G11B 5/66 |
| | | | | 428/828 |
| 2011/0141621 A1* | 6/2011 | Bian | ............... | G11B 5/65 |
| | | | | 360/135 |
| 2012/0127609 A1 | 5/2012 | Chang et al. | | |
| 2012/0231298 A1 | 9/2012 | Singh et al. | | |
| 2013/0052485 A1* | 2/2013 | Wu | ............... | G11B 5/66 |
| | | | | 428/827 |
| 2013/0155542 A1* | 6/2013 | Tonooka | ............... | G11B 5/84 |
| | | | | 360/75 |
| 2014/0044993 A1* | 2/2014 | Li | ............... | H04W 4/021 |
| | | | | 428/828 |
| 2015/0179202 A1* | 6/2015 | Kim | ............... | G11B 5/66 |
| | | | | 428/828.1 |
| 2016/0035381 A1* | 2/2016 | Tonooka | ............... | G11B 5/64 |
| | | | | 360/135 |

OTHER PUBLICATIONS

Choe et al., "Magnetic Switching Behavior of Granular Perpendicular Magnetic Media With Different Lateral and Vertical Exchange Coupling," IEEE Transactions on Magnetics, vol. 50, No. 11, Nov. 2014, pp. 1-4.

\* cited by examiner

| Sample | ADC (Gb/in2) | ADC gain (%) | BPI |
|---|---|---|---|
| 706~ Lat-ECL | 1090 | 2.5 | 2048 |
| 704~ Lat-ECL | 1077 | 1.2 | 2025 |
| 702~ No Lat-ECL (reference) | 1064 | - | 1992 |

PERPENDICULAR MAGNETIC RECORDING MEDIA WITH LATERAL EXCHANGE CONTROL LAYER

FIELD OF THE INVENTION

The present invention relates to magnetic data recording and more particularly to a magnetic media having a lateral exchange control layer in a magnetic recording layer for increased lateral exchange and reduced magnetic exchange sigma.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft under-layer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

In a perpendicular magnetic recording system, the magnetic media on which data is written can be formed with a soft magnetic under-layer and a magnetic recording layer formed over the soft magnetic recording layer. The magnetic recording layer can be formed as individual magnetic grains that are separated by non-magnetic oxide layers. In order to increase data density, it is desirable to decrease the size of the magnetic grains. However certain engineering constraints have made it difficult to further reduce the size of magnetic grains and increase the magnetic data density while also maintaining high signal resolution and data integrity.

SUMMARY

The present invention provides a magnetic data recording media that includes a magnetically soft under-layer and a magnetic recording layer formed over the magnetically soft under-layer. The magnetic recording layer includes a granular magnetic layer, a lateral exchange control layer positioned on the granular magnetic layer and a cap layer formed over the lateral exchange control layer, wherein the lateral exchange control layer comprises an alloy that includes Co and at least one of W, Ru, Hf, Ta, Nb and Fe.

The presence of the lateral exchange control layer advantageously increases the magnetic saturation moment while also increasing the non-magnetic boundary width. This provides reduced bit error rate and also increased signal to noise ratio, thereby allowing for increased areal density.

The lateral exchange control layer can be formed as islands over magnetic grains of the granular magnetic layer. The material of the lateral exchange control layer has a high surface energy which causes it to deposit on the individual grains of the granular magnetic layer, but not on the non-magnetic boundary material.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 7 is a table illustrating performance parameters for various magnetic media with and without a lateral exchange layer;

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
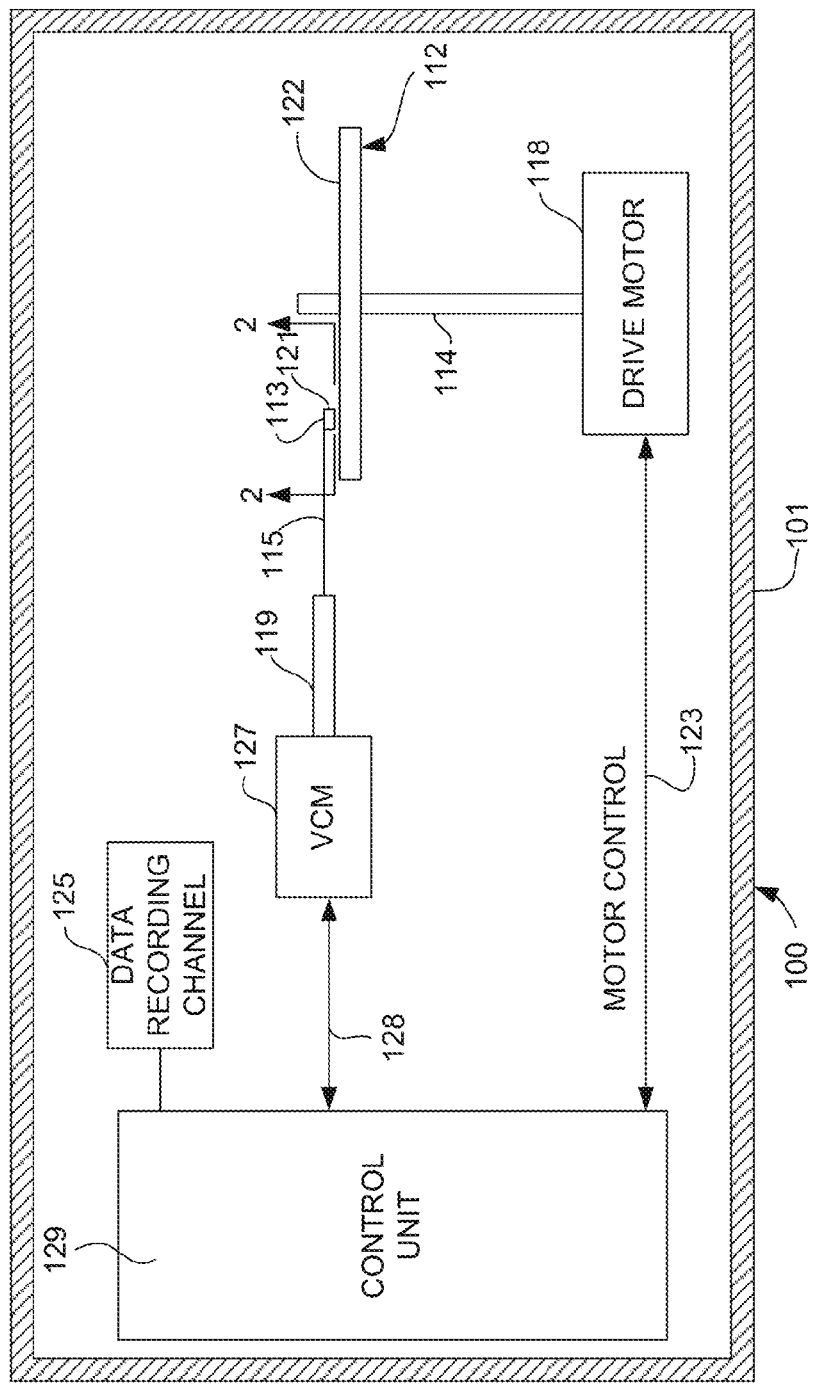
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
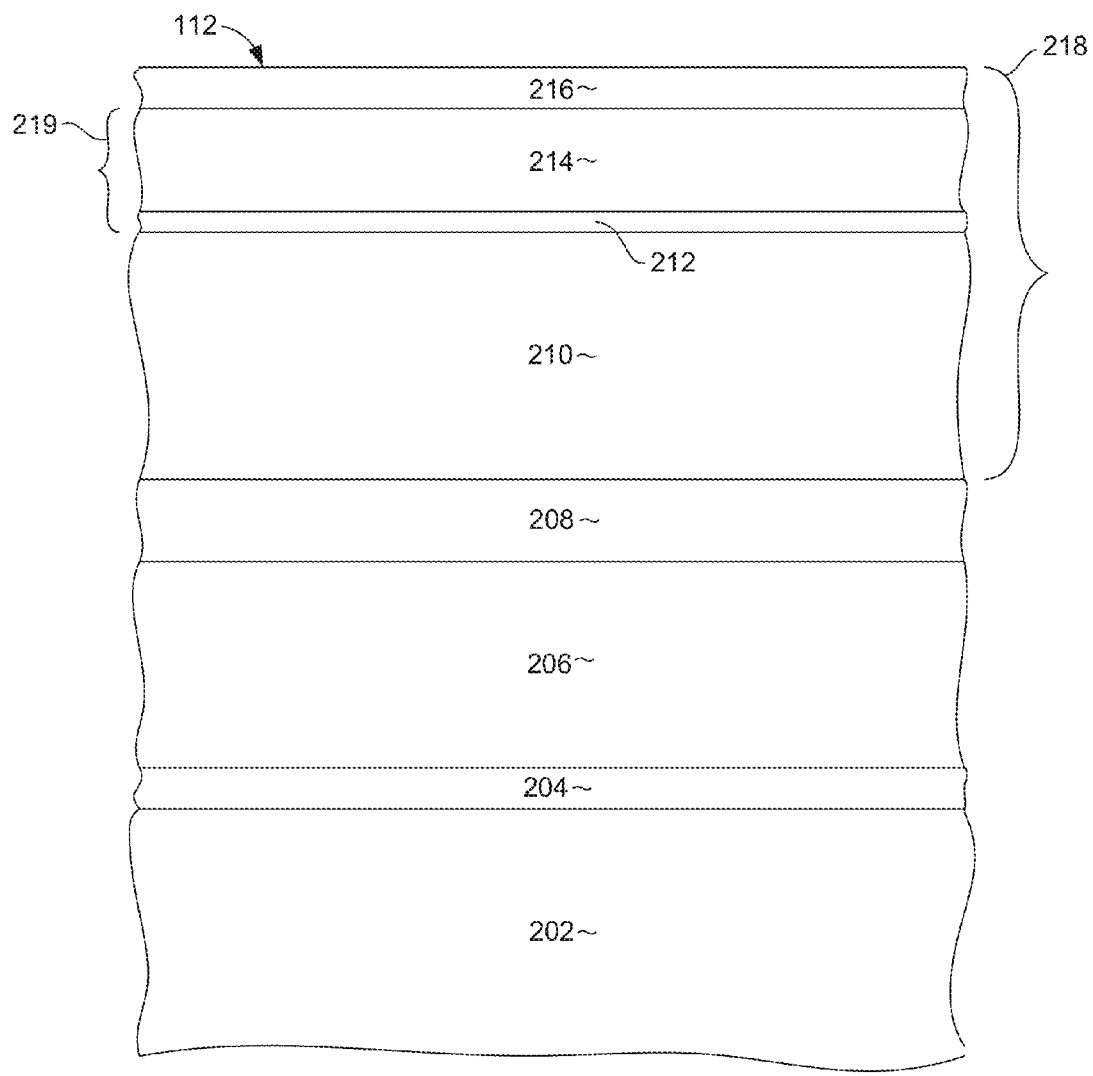
FIG. 2 is cross-sectional view of a portion of a magnetic media.

FIG. 2 shows a cross section of a portion of the magnetic media 112. As shown in FIG. 2, the magnetic media 112 includes a substrate such as glass and an adhesion layer 204 formed on the substrate 202. A magnetically soft under-layer 206 is formed on the adhesion layer 204. An exchange break layer 208 is formed over the magnetically soft under-layer 208, and a magnetic recording layer 218 is formed over the exchange break layer. The adhesion layer 204 can be a Ni alloy, and the magnetically soft under-layer 206 can be an alloy of Co, Fe and some other component X. The exchange break layer 208 can be a non-magnetic material such as Ru or Ru alloy and is sufficiently thick to prevent magnetic exchange coupling between the soft magnetic under-layer 206 and the magnetic recording layer 218.

Figure 3:
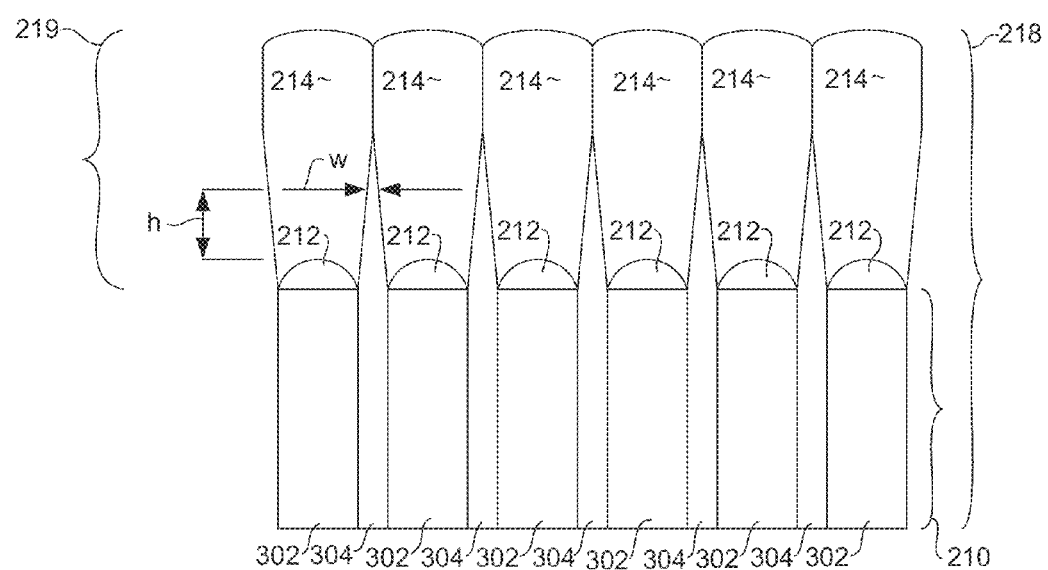
FIG. 3 is an enlarged view of a portion of the magnetic media showing individual grains structures and individual islands of lateral exchange control material therein.

The magnetic recording layer includes a granular oxide layer 210 and a non-oxide top layer 219 formed over the granular oxide layer 210. The non-oxide top layer 219 includes a novel lateral exchange control layer 212 formed over the magnetic oxide layer 210, and a magnetic cap layer 214 formed over the lateral exchange control layer 212. The magnetic recording layer and its grain structure are shown in greater detail in FIG. 3. In FIG. 3 it can be seen that the granular oxide layer 210 includes magnetic grains 302 that are separated from one another by non-magnetic oxide boundary layers 304.

It can also be seen in FIG. 3 that the lateral exchange control layer 212 is formed as islands over the magnetic oxide grains 302, with little or no lateral exchange layer 212 being formed in or on the magnetic oxide boundary layer 304. This advantageously results from the high surface energy of the lateral exchange control layer. 212. To this effect, the lateral exchange control layer 212 includes at least 10% of high surface energy elements which can include one or more of W, Ru, Hf, Ta, Nb, or Fe. The lateral exchange control layer has high magnetic saturation moment and thereby advantageously increases the lateral (side to side) exchange coupling. The lateral exchange control layer 212 preferably has a higher magnetic saturation moment than the granular magnetic layer 210 or the cap layer 214. More preferably, the lateral exchange control layer 212 has a magnetic saturation moment of between 650 emu/cc and 800 emu/cc. The lateral exchange control layer can be formed of an alloy of Co or Fe and X, where X is non-magnetic material, and wherein the concentration of X is less than 25 atomic percent. In addition, the presence of the lateral exchange layer 212 also advantageously increases the width of the non-magnetic oxide boundary in the location between the grains of the cap layer 214. As a result, the lateral exchange control layer reduces magnetic exchange sigma. The non-magnetic boundary 304 can have a width w at a height h from the top of the lateral exchange control layer 212, where w is greater than or equal to 0.5 nm and h is greater than or equal to 1.0 nm. The boundary layers 304 at the location of the lateral exchange control layer preferably have a width of at least 1 nm.

Figure 4:
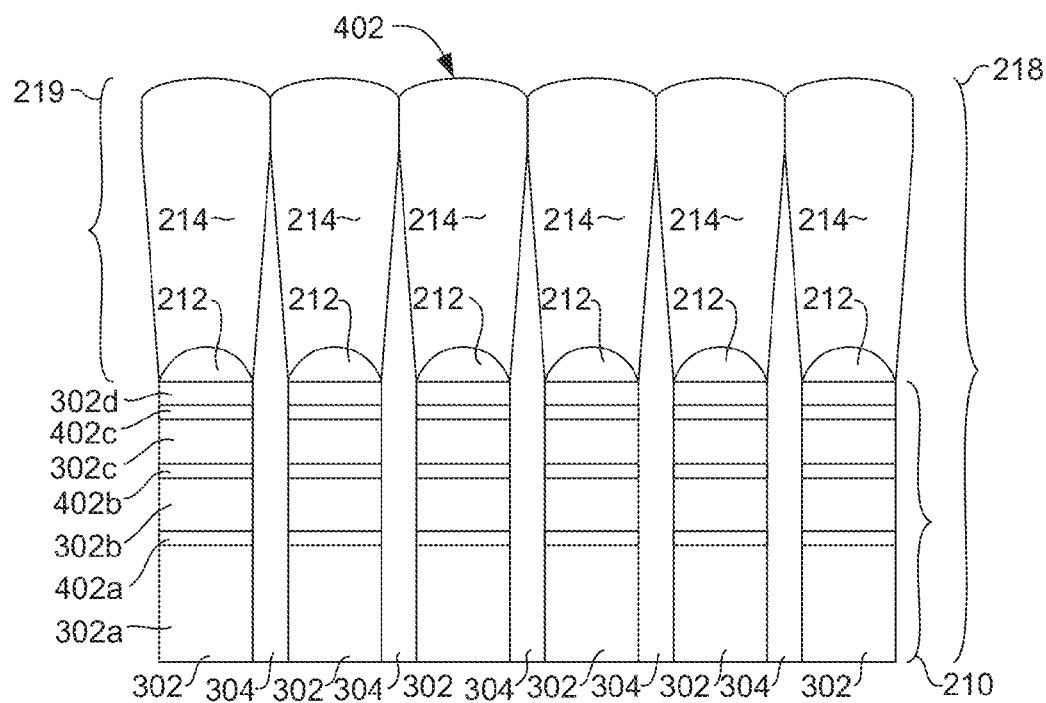
FIG. 4 is a view similar to that of FIG. 3 showing an alternate possible embodiment.

FIG. 4 illustrates another possible embodiment of a magnetic media 400 having a slightly modified magnetic oxide layer 210. The magnetic oxide layer 210 includes one or more vertical exchange control layers. In this case, the magnetic oxide layer includes three vertical exchange control layers 402a, 402b, 402c, that divide the magnetic oxide into sections 302a, 302b, 302c, 302d. The vertical exchange control layers 402a-c control a vertical exchange coupling. The vertical exchange coupling can be controlled by changing the thickness of the vertical exchange control layers. This vertical exchange coupling is fundamentally different from the lateral exchange coupling that is enhanced by the presence of the lateral exchange control layer 212. Whereas the vertical exchange coupling provided by the layers 402a-c is oriented in a vertical direction (up and down in FIG. 4), the exchange coupling enhanced by the lateral exchange control layer is in a lateral direction (side to side in FIG. 4). The advantages provided by the lateral exchange control layer 212 will be better understood in light of the following discussion with reference to FIGS. 5-14.

Figure 5:
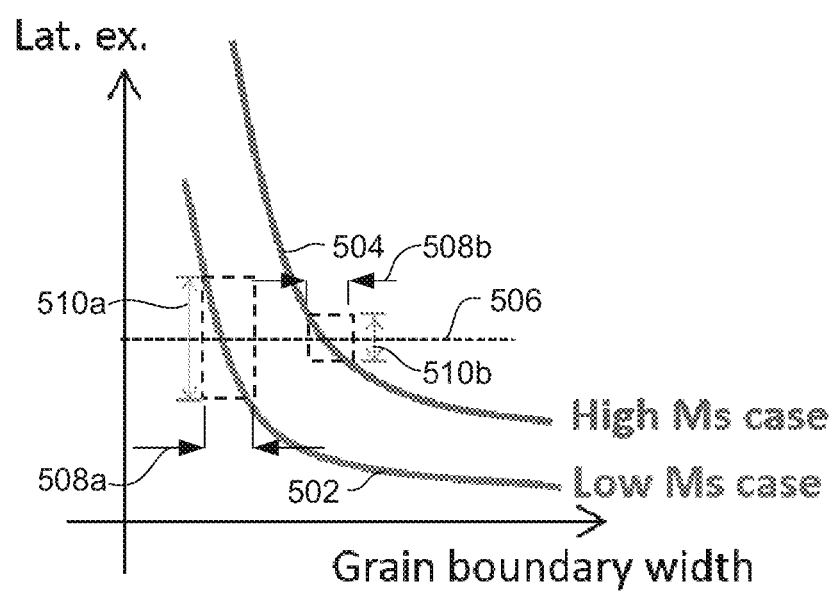
FIG. 5 is a graph illustrating a relationship between lateral exchange coupling and grain boundary width.

FIG. 5 shows a graph illustrating a relationship between lateral exchange coupling and grain boundary width. In FIG. 5, the curve 502 shows this relationship for a media that does not have the lateral exchange control layer 212 of FIGS. 2-4. Dashed line 506 shows a level of lateral exchange coupling desired for good writability and thermal stability of recorded data. A magnetic media has an inevitable amount of variation in non-magnetic boundary width. This variation in non-magnetic boundary width is represented by the horizontal distance 508a for line 502, and 508b for line 504. As can be seen, the variation in boundary width results in a corresponding variation lateral exchange coupling, referred to as lateral exchange sigma, which is represented by vertical distances 510a for line 502 and 510b for line 504.

For line 502 (the case without the lateral exchange control layer) it can be seen that, achieving the desired amount of lateral exchange coupling puts the media in a relatively steep portion of the curve, causing a very high lateral exchange coupling sigma for a given amount of boundary layer thickness variation. It is desirable to have a low amount of lateral exchange sigma, and this could be achieved by increasing the grain boundary width. However, this would result in an unacceptably low lateral exchange coupling, resulting in poor writability and thermal stability.

For line 504 however, the presence of the lateral exchange control layer increases the average saturation magnetization Ms of non-oxide top layer 219 (FIG. 2-4) because the lateral exchange control layer has high Ms, thereby effectively raising the entire curve 504. This means that grain boundary width can be increased while still achieving the desired amount of lateral exchange coupling (line 506). Therefore, this desired location is at a flatter portion of the curve 504. This leads to a reduced lateral exchange sigma 510b for the same given grain boundary width variation 508b. Therefore, the presence of the lateral exchange control layer 212 (FIGS. 2-4) allows for an advantageous reduction in lateral exchange sigma due to the increased Ms of the non-oxide top layer 219 (FIGS. 2-4).

Figure 6:
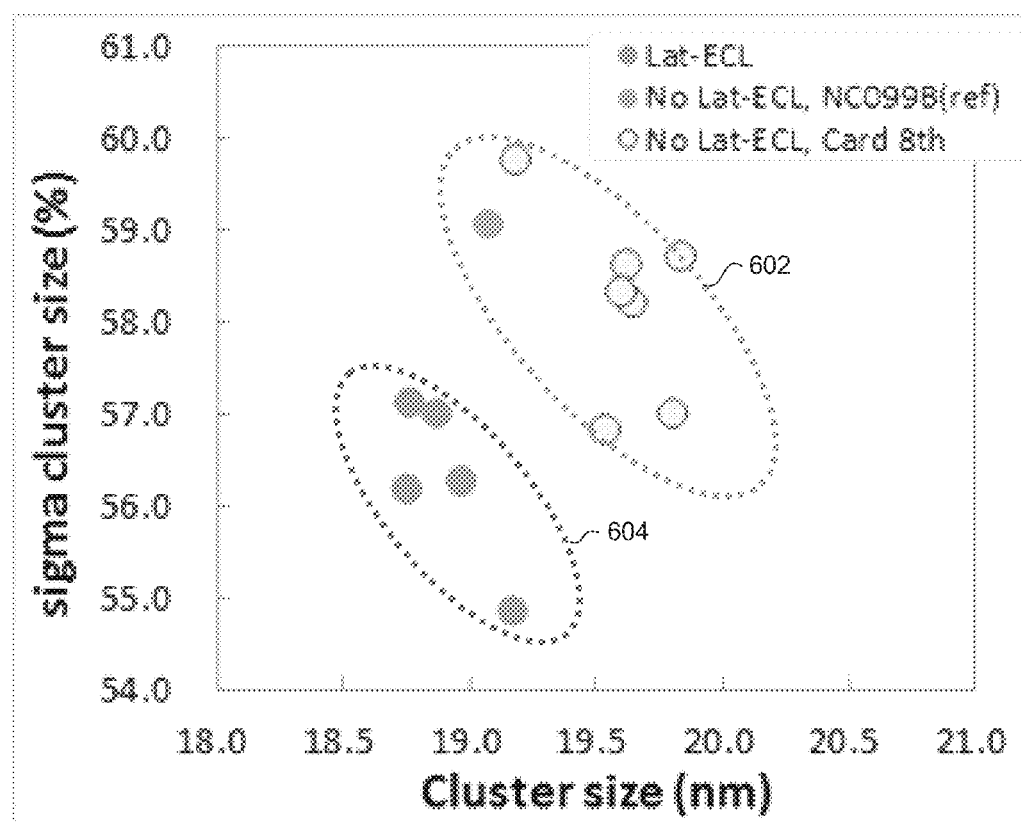
FIG. 6 is a graph showing cluster size sigma vs. cluster size in nm.

This effect is further verified by FIG. 6, which shows cluster size sigma verses cluster size in nm. The cluster size sigma correlates with lateral exchange sigma. Region 602 shows the cluster size sigma for a magnetic media having no lateral exchange control layer and region 604 shows the cluster size sigma for a magnetic media having a lateral exchange control layer as described above. As can be seen, cluster size sigma is reduced while maintaining the cluster size for the media having the lateral exchange control layer.

The table of FIG. 7 shows experimental results of test samples for a sample having no lateral exchange control layer (row 702) as compared with two samples having a lateral exchange control layer as described above (rows 704, 706). Column 708 shows the areal density capability in Gb/in$^2$ for each of the samples. As can be seen in column 710, the presence of the lateral exchange control layer resulted in a data density gain of 1.2 percent for the sample of row 704 and 2.5 percent for the sample of row 706, as compared with the sample having no lateral exchange control layer (row 702). Column 712 shows the linear density in bits per inch. As can be seen, the presence of the lateral exchange control layer resulted in an increase in linear data density.

In order to form a lateral exchange control layer 212 (FIG. 2) having a high surface energy as well as a high saturation magnetization, it becomes advantageous to employ certain alloying elements to an alloy containing Co. A lateral exchange control layer includes at least one element which has high surface energy. From this point of view, Fe, Nb, Ta, Hf, Ru and W are suitable to be included in the lateral exchange control layer 212 because the surface energy of Fe, Nb, Ta, Hf, Ru, and W is higher than that of Co. The concentration of high surface energy elements, Fe, Nb, Ta, Hf, Ru, and W should be more than 10% to realize advantageously high enough surface energy for the lateral exchange control layer.

In order to exhibit high Ms as well as a high surface energy, the lateral exchange control layer can be formed of an alloy of Co or Fe and X, where X is a non-magnetic material, and wherein the concentration of X is less than 25%. If the concentration of non-magnetic material in the lateral exchange control layer is more than 25%, magnetic saturation moment will not be sufficiently high. A specific preferable example of an advantageous alloy for use as the lateral exchange layer is Co—Cr—Ru—W where the combined concentration of Ru and W is at least 10 atomic percent and the combined concentration of non-magnetic elements (i.e. Ru, Cr and W) is less than 25 atomic percent.

Therefore, the lateral exchange control layer includes at least 10 atomic percent of an material having a high surface energy, which can be one or more of W, Ru, Hf, Ta, Nb, and Fe, and also includes a non-magnetic material in a concentration of up to 25 atomic percent. More preferably, the concentration of non-magnetic material is more than 10% because it is difficult to sputter deposit thin films if the concentration of non-magnetic material is less than 10%. The capping layer 214 (FIGS. 2-4) can be formed of an alloy of Co, Cr, Pt and B.

Figure 8:
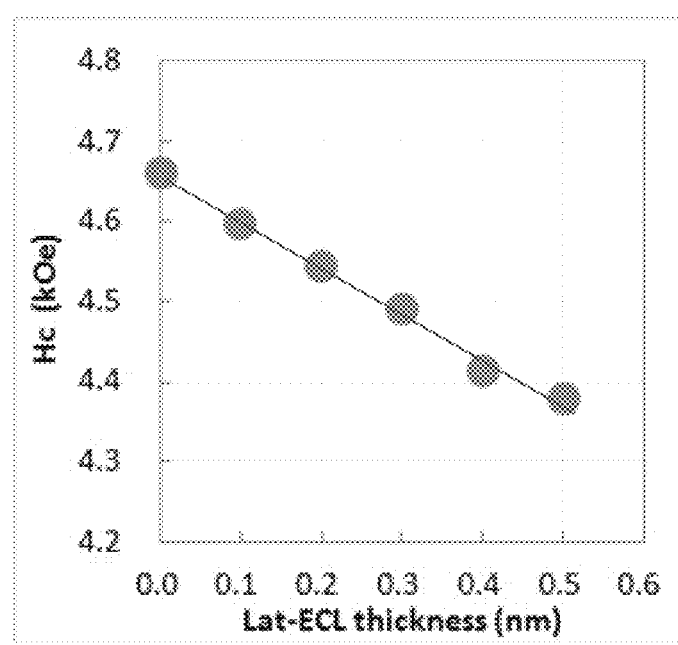
FIG. 8 is a graph showing Hc vs. thickness of a lateral exchange control layer.
Figure 9:
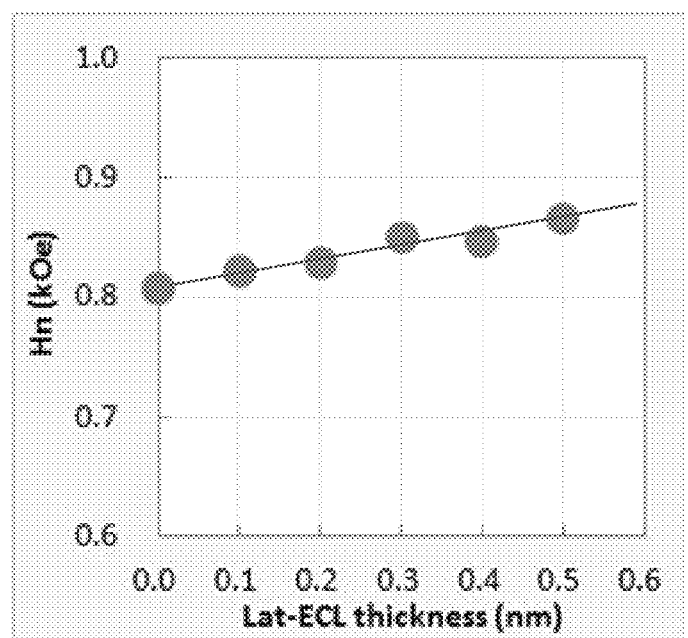
FIG. 9 is a graph illustrating a relationship between Hn and lateral exchange control layer thickness.
Figure 10:
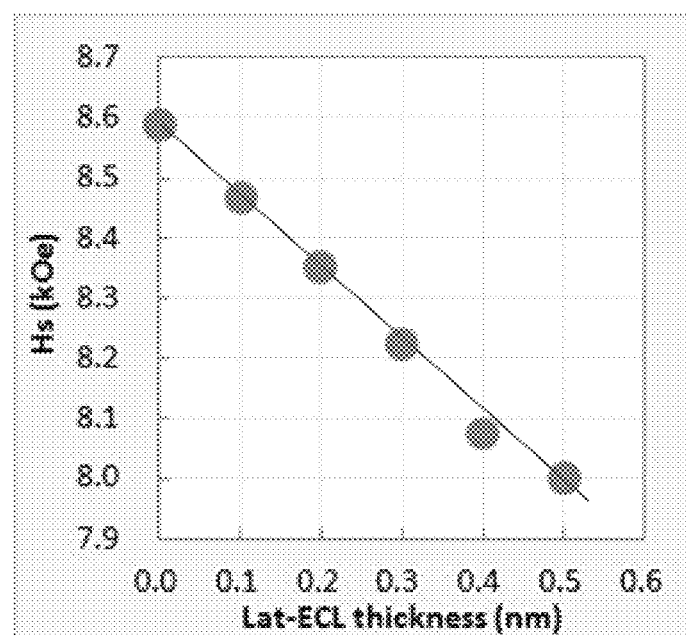
FIG. 10 is a graph illustrating a relationship between Hs and lateral exchange control layer thickness.
Figure 11:
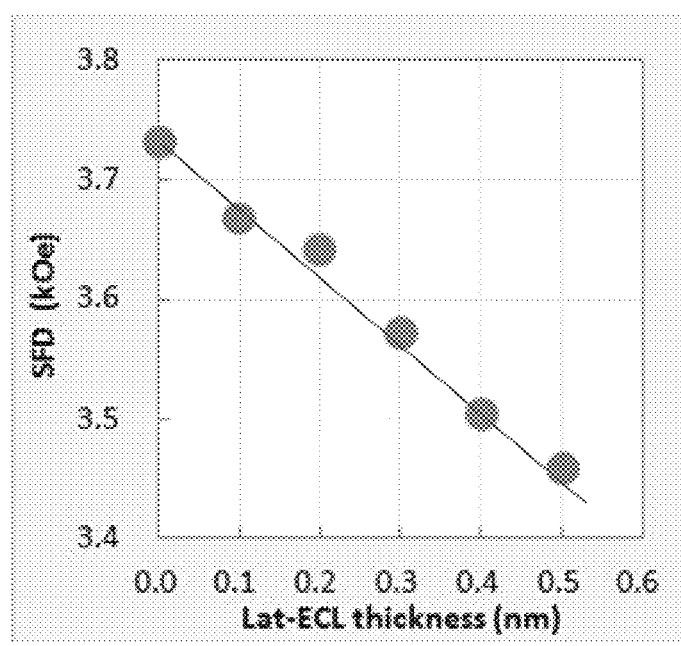
FIG. 11 is a graph illustrating a relationship between switching field distribution (SFD) and lateral exchange coupling layer thickness.

FIGS. 8-11 graphically show how various magnetic properties of the recording media vary with the thickness of the lateral exchange layer 212 (FIG. 2). FIG. 8 shows that magnetic coercivity Hc drops with increasing lateral exchange layer thickness. FIG. 9 shows that Hn actually rises slightly with increasing exchange layer thickness. The increase in Hn indicates an increase in lateral exchange coupling. FIG. 10 shows that Hs decreases with increasing lateral exchange layer thickness, and FIG. 11 shows that the switching field distribution (SFD) also decreases with increasing lateral exchange layer thickness. All behaviors of the magnetic properties described above indicate that lateral exchange coupling increases with increasing lateral exchange control layer thickness.

Figure 12:
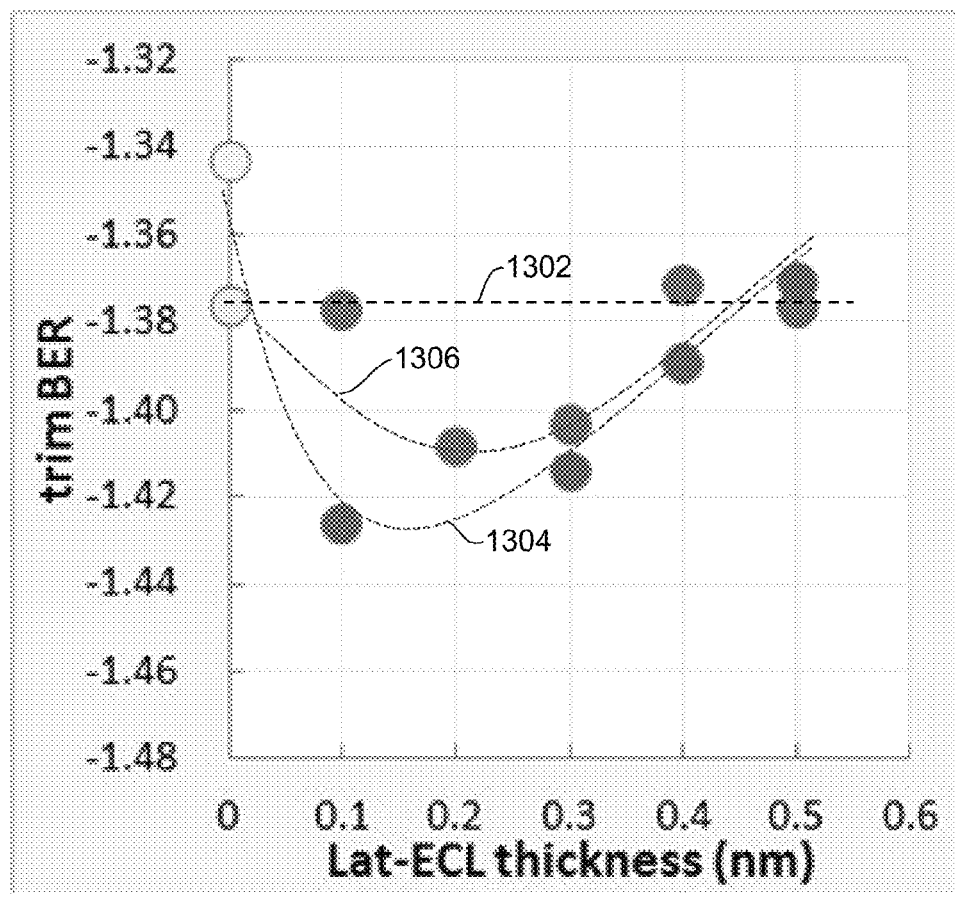
FIG. 12 is a graph illustrating a relationship between bit error rate and lateral exchange control layer thickness for various media with and without a lateral exchange control layer.

FIG. 12 shows a graph of trim Bit Error Rate (BER) as a function of lateral exchange control layer thickness. As those skilled in the art will appreciate, a lower bit error rate is desirable and translates into an advantageous increase in areal data density. The horizontal line 1302 represents the bit error rate for a media having no lateral exchange control layer at all. Lines 1304 and 1306 represent the bit error rate for two different samples of media having the above described lateral exchange control layer. Line 1304 represents the bit error rate for a media having a 2.5 nm thick cap layer 214 (FIGS. 2-4), and line 1306 represents the bit error rate for a media having a 3.5 nm thick cap layer 214 (FIGS. 2-4). As can be seen, the bit error rate is affected by thickness of the cap layer 214 and the thickness of the exchange control layer 212 (FIGS. 2-4). The bit error rate drops with increasing lateral exchange control layer thickness up to a thickness of about 0.15 nm for the media of line 1304 and about 0.2 nm for the case of line 1306, and then gradually begins to increase again. It can be seen from FIG. 12 that a significant reduction in bit error rate can be achieved through the use of a lateral exchange control layer, especially when the lateral exchange control layer is at an optimal thickness.

Figure 13:
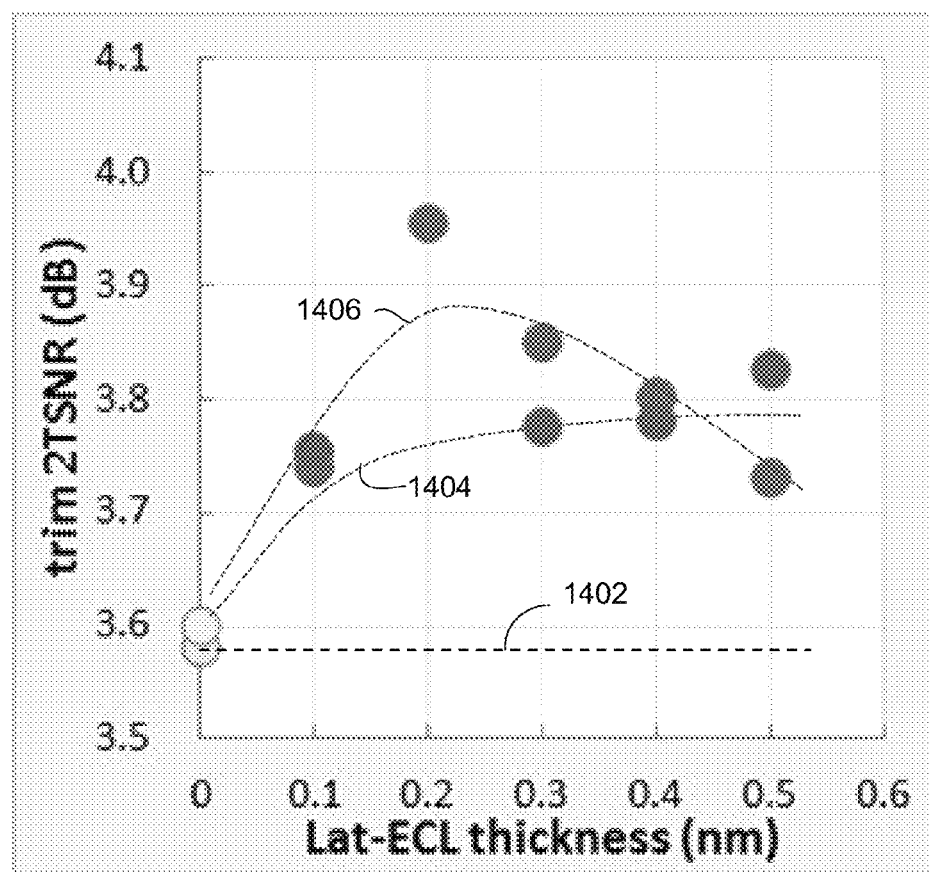
FIG. 13 is a graph illustrating a relationship between signal to noise ratio and lateral exchange coupling layer thickness for various media with and without a lateral exchange control layer.

FIG. 13 shows the how the signal to noise ratio varies with varying thickness of lateral exchange control layer. As those skilled in the art will appreciate, a high signal to noise ratio is very desirable. Line 1402 shows the signal to noise ratio when no lateral exchange control layer at all is used. Line 1404 shows how the signal to noise ratio varies with lateral exchange control layer thickness for a media having a 2.5 nm thick cap layer 214 (FIGS. 2-4). Line 1406 shows how the signal to noise ratio varies with lateral exchange control layer thickness for a media having a 3.5 nm thick cap layer 214 (FIGS. 2-4). As can be seen the presence of the lateral exchange control layer, especially at optimal thickness, provides a significant increase in signal to noise ratio.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic media, comprising:
   a magnetically soft under-layer; and
   a magnetic recording layer formed over the magnetically soft under-layer, the magnetic recording layer further comprising:
   a granular magnetic layer;
   a magnetic lateral exchange control layer positioned on the granular magnetic layer; and
   a magnetic cap layer formed over the lateral exchange control layer, wherein the magnetic cap layer comprises magnetic grains separated by non-magnetic grain boundaries, and wherein the non-magnetic grain boundaries have a thickness that gradually decreases with increasing distance from the lateral exchange control layer;
   wherein the lateral exchange control layer comprises an alloy that includes Co and at least one of W, Ru, Hf, Ta, Nb and Fe, and wherein the lateral exchange control layer is formed as islands on the granular magnetic layer.

2. The magnetic media as in claim 1, wherein the concentration of non-magnetic material in the lateral exchange control layer is less than 25 atomic percent.

3. The magnetic media as in claim 1, wherein the concentration of non-magnetic material in the lateral exchange control layer is greater than 10 atomic percent and less than 25 atomic percent.

4. The magnetic media as in claim 1, wherein the concentration of one or more of W, Ru, Hf, Ta, Nb and Fe is at least 10 atomic percent.

5. The magnetic media as in claim 1 wherein the lateral exchange control layer has a higher magnetic saturation than the granular magnetic layer or the cap layer.

6. The magnetic media as in claim 1 wherein the lateral exchange control layer has a magnetic saturation of between 650 emu/cc and 800 emu/cc.

7. The magnetic media as in claim 1, wherein the lateral exchange control layer contains no oxide.

8. The magnetic media as in claim 1, wherein the lateral exchange control layer has a thickness of 0.1 nm to 0.5 nm.

9. The magnetic media as in claim 1 wherein the cap layer is at least 1.0 nm thick and wherein the non-magnetic grain boundaries have a width of at least 0.5 nm at a location 1.0 nm from the lateral exchange control layer.

10. The magnetic media as in claim 1, wherein the lateral exchange control layer is formed as islands separated by non-magnetic boundary layers, and wherein the boundary layers at the location of the lateral exchange control layer have a width of at least 1 nm.

11. A magnetic media, comprising:
    a magnetic recording layer formed as a plurality of magnetic structures separated by non-magnetic boundary layers extending vertically between the magnetic structures, the magnetic structures comprising;
    a magnetic oxide structure;
    a magnetic lateral exchange control layer having a surface energy higher than that of Co causing it to be formed as an island on the magnetic oxide structure; and
    a magnetic cap layer formed over the magnetic oxide structure, wherein the magnetic cap layer comprises magnetic grains separated by non-magnetic grain boundaries, and wherein the non-magnetic grain boundaries have a thickness that gradually decreases with increasing distance from the lateral exchange control layer.

12. The magnetic media as in claim 11, wherein the lateral exchange control layer is an alloy comprising Co and at least one of W, Ru, Hf, Ta, Nb and Fe.

13. The magnetic media as in claim 11, wherein the lateral exchange control layer has a higher magnetic saturation than the magnetic oxide structure or the magnetic cap layer.

14. The magnetic media as in claim 11, wherein the lateral exchange control layer has a magnetic saturation of between 650 emu/cc and 800 emu/cc.

15. The magnetic media as in claim 11, wherein the non-magnetic boundary layers have a width of at least 1 nm at the location of the lateral exchange control layer.

16. The magnetic media as in claim 11, wherein the non-magnetic boundary layers have a width of at least 0.5 nm at a location within the cap layer that is 1.0 nm above the lateral exchange control layer.

17. A magnetic data recording system, comprising:
    a housing;
    a magnetic media mounted within the housing; and
    a magnetic read write transducer mounted within the housing for movement adjacent to a surface of the magnetic media;
    wherein the magnetic media comprises:
    a magnetically soft under-layer;
    a magnetic recording layer formed over the magnetically soft under-layer, the magnetic recording layer further comprising:
    a granular magnetic layer;
    a magnetic lateral exchange control layer positioned on the granular magnetic layer; and
    a magnetic cap layer formed over the lateral exchange control layer wherein the magnetic cap layer comprises magnetic grains separated by non-magnetic grain boundaries, wherein the non-magnetic grain boundaries have a thickness that gradually decreases with increasing distance from the lateral exchange control layer;
    wherein the lateral exchange control layer comprises an alloy that includes Co and at least one of W, Ru, Hf, Ta, Nb and Fe, and wherein the lateral exchange control layer is formed as islands on the granular magnetic layer.

* * * * *